Figure 1:
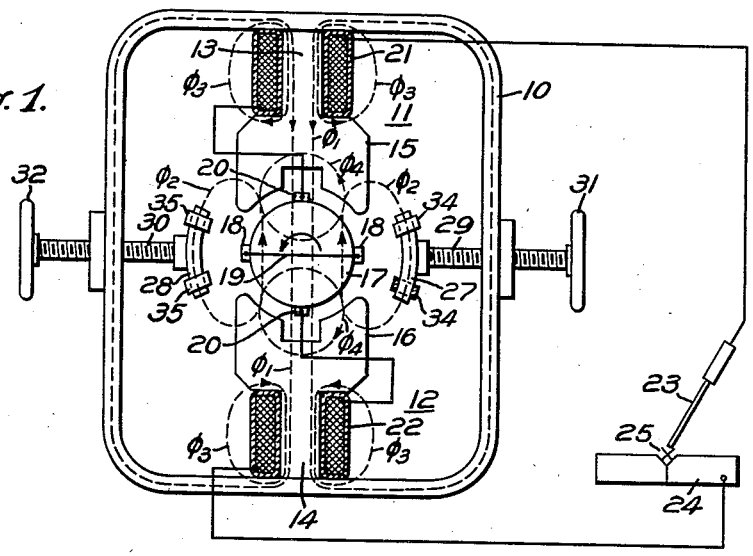

Nov. 6, 1934.  J. H. BLANKENBEUHLER  1,979,665
DYNAMO ELECTRIC MACHINE
Filed July 26, 1933

WITNESSES:
R. J. Fitzgerald
Thu C. Groome

INVENTOR
John H. Blankenbuehler.
BY
Crawford
ATTORNEY

Patented Nov. 6, 1934

1,979,665

UNITED STATES PATENT OFFICE 1,979,665

DYNAMO-ELECTRIC MACHINE

John H. Blankenbuehler, Edgewood, Pa., assignor to Westinghouse Electric & Manufacturing Company, East Pittsburgh, Pa., a corporation of Pennsylvania Application July 26, 1933, Serial No. 682,187

13 Claims. (Cl. 171—227)

My invention relates, generally, to dynamo-electric machines and it has particular relation to dynamo-electric machines of the cross field type which are suitable for use in arc welding.

In the past, generators of the cross field type have been regulated in a variety of ways in order to obtain the desired current and voltage outputs which will be most satisfactory for certain particular load conditions. In particular, it is desirable to provide for regulating a dynamo-electric machine of this type over a relatively wide range when it is used for arc welding. This is especially desirable, since, under certain conditions, it may be desirable to use a relatively low welding current, while under other conditions, it may be desirable to use a relatively high welding current. If it is possible to obtain these two extremes of operating conditions in a single machine, it is unnecessary to provide additional machines for operating at these extreme ranges. It is also desirable to provide dynamo-electric machines for this application which may be regulated over a large number of increments between the upper and lower operating ranges in order to provide more precisely the exact welding conditions which will most advantageously produce a sound and satisfactory weld.

In general, two methods have been used for regulating the output of a generator of the cross field type. The first of these methods may be termed the electrical method and the second may be termed the magnetic method. According to the first method, the amount of current flowing through the field windings is varied in order to alter, as may be desired, the main flux which is generated for causing current to flow between the short-circuited brushes. The second or magnetic method has been used in the past to vary the amount of leakage flux to thereby vary the main flux.

Various systems have been proposed for regulating a dynamo-electric machine of the cross field type in accordance with the electrical method. Some of these comprise the insertion of adjustable resistors in series circuit relation with all or part of the series field windings. Others comprise the use of auxiliary windings around the series field windings and are provided with variable resistors for adjusting the current flowing therethrough to provide the desired flux conditions.

The magnetic method of control of the output of machines of the cross field type has been accomplished by providing movable portions of the pole pieces which support the pole shoes from the frame. By increasing or decreasing the amount of magnetic material in the pole pieces, it is possible to obtain a certain range of regulation. Other magnetic means comprise the use of adjustable magnetic shunts positioned between the pole shoes and the main frame in order to vary the leakage flux around the series field windings.

There are other systems that have been proposed for regulating the output of a dynamo-electric machine of the cross field type, but all of these, as far as I am aware, have provided for either regulating the main flux by electrical or magnetic means or have provided for regulating the leakage flux around the series field windings. All of these systems have certain defects which it is desirable to overcome. For instance, the auxiliary field windings are expensive in first cost, increase the size of the machine, and in operation decrease the efficiency thereof by introducing certain losses. If the adjustable resistor is utilized in series circuit relation with the series field winding, it inherently decreases the efficiency of the circuit by wasting a considerable amount of electrical energy in the form of heat. The magnetic systems which have been proposed in the past are often difficult to accurately adjust and, in general, constitute a considerable complication in the construction of the machine.

The object of my invention, generally stated, is to provide a dynamo-electric machine of the cross field type for arc welding which shall be simple and efficient in operation and which may be readily and economically manufactured and controlled.

The principal object of my invention is to provide for regulating the output of a dynamo-electric machine of the cross field type.

Another important object of my invention is to provide for regulating the amount of armature reaction flux in a dynamo-electric machine of the cross field type.

Another object of my invention is to provide for moving a magnetic shunt between the pole tips of a dynamo-electric machine of the cross field type to increase or decrease the amount of armature reaction flux to correspondingly decrease or increase the output of the machine.

Other objects of my invention will in part be obvious and in part appear hereinafter.

My invention accordingly is disclosed in the embodiment hereof shown in the accompanying drawing and comprises the features of construction, combination of elements, and arrangement of parts which will be exemplified in the construction hereinafter set forth, and the scope of the application of which will be indicated in the appended claims.

Figure 2:
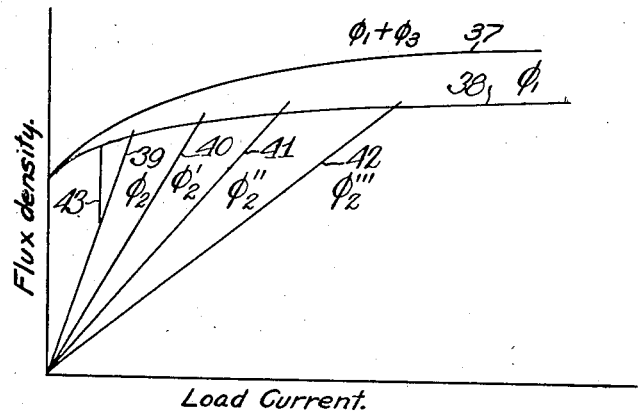
Figure 3:
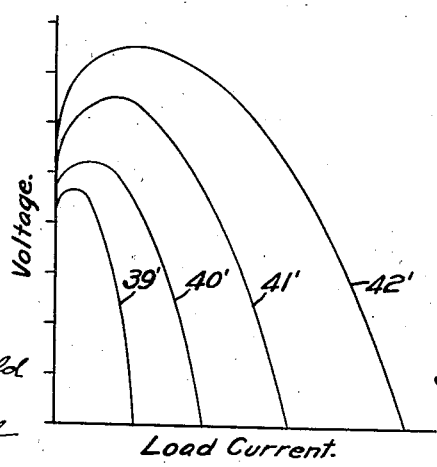

For a more complete understanding of the nature and scope of my invention, reference may be had to the following detailed description, taken in connection with the accompanying drawing in which:

Figure 1 is a diagrammatic illustration of a dynamo-electric machine of the cross field type constructed in accordance with my invention: and Figs. 2 and 3 show a number of curves which demonstrate the characteristics possessed by a dynamo-electric machine constructed in accordance with my invention.

As set forth hereinbefore, the regulation of a dynamo-electric machine of the type disclosed in Fig. 1 of the drawing may be effected by changing the total main flux either electrically or magnetically. In contradistinction to either of these types of control, I have provided means for regulating the flux which is generated due to armature reaction and have thereby provided a very simple, accurate, and efficient means for regulating the output of a machine of this type.

It is well known that the output of a dynamo-electric machine of the cross field type is a function of the flux which is cut by the armature for generating current in the short-circuited brushes. In turn, the flux which generates this short circuit current is a function of the difference between the main flux and the armature reaction flux. Thus according to my invention I have provided for regulating the armature reaction flux rather than the main flux. When the armature reaction flux is increased, the difference between the main flux and the armature reaction flux is correspondingly decreased with a corresponding decrease in the output of the dynamo-electric machine. Conversely, when the armature reaction flux is decreased, the difference between the main flux and the armature reaction flux is increased with a corresponding increase in the output of the machine.

The desired regulation of the armature reaction flux is accomplished by the provision of a movable shunt of magnetic material disposed between the pole tips of the machine and adjacent to the armature. When the magnetic shunt is moved toward the armature, the reluctance of the path of the armature reaction flux is decreased and this flux is correspondingly increased, while, when the magnetic shunt is moved in the opposite direction, a correspondingly opposite effect is obtained.

It is well known in the prior art that magnetic shunts may be provided between the pole tips of generators of conventional design. However, as far as I am aware, all of the shunts of this type in the prior art have been utilized for shunting the main flux between the pole pieces and around the armature. When the flux which is shunted around the armature in this manner is increased, the output of the generator is correspondingly decreased. A shunt of this type, however, would not be effective to obtain this type of regulation in a machine of the cross field type, because of the inherent characteristics thereof are such as to preclude this type of regulation.

Referring particularly to Fig. 1 of the drawing, a dynamo-electric machine is provided having a main frame 10, to which inwardly projecting pole pieces, shown generally at 11 and 12, are secured by any suitable means. Each of the pole pieces 11 and 12 comprises pole bodies 13 and 14 and pole shoes 15 and 16, respectively. Since the major portion of the flux in a machine of this type exists only in the pole shoes 15 and 16, they are illustrated as having a relatively large section in accordance with standard practice.

An armature 17 is provided between the pole pieces 11 and 12 and is there mounted for rotation by any suitable means well known in the art. The armature 17 is provided with brushes 18—18 which are short circuited by means of a conductor 19. At right angles to the plane of the brushes 18—18 a pair of main brushes 20—20 is provided which may be connected in series circuit relation with series field windings 21 and 22 surrounding the pole bodies 13 and 14, respectively, as illustrated.

The remaining terminals of the series field windings 21 and 22 are connected, as shown, to a welding electrode 23 and work 24 between which an arc 25 is to be maintained to perform the welding operation.

The flux that is generated by means of the series field windings 21 and 22 may be represented by the dotted lines $\phi_1$ representing the main flux, and by the dotted lines $\phi_3$ which represent the leakage flux. No attempt will be made to accurately illustrate the relative flux densities throughout the magnetic circuits of the machine or to show flux concentrations, which it is understood will, of course, occur.

The conductors of the armature 17 cutting the main flux $\phi_1$ cause a current to flow in conductor 19 between the short circuited brushes 18—18, and as a result the cross flux, which may be represented by the dotted lines $\phi_4$, is produced. As will be readily understood, the flux $\phi_4$ constitutes the major portion of the flux in a machine of this type, and it is for this reason that the pole shoes 15 and 16 are constructed of relatively large cross section in order to provide a low reluctance path for this mix.

As a result of the conductors of the armature 17 cutting the flux $\phi_4$, a potential is generated across the main brushes 20—20 and welding current is caused to flow therethrough to provide for performing the welding operation. This flow of current produces an armature reaction flux which may be represented by the dotted lines $\phi_2$. As illustrated, the armature reaction flux $\phi_2$ is opposite in direction to the main flux $\phi_1$, and it is the combination and interaction of these two fluxes which provide a dynamo-electric machine of this type with a differential compounding characteristic.

In order to regulate the reluctance of the path of the armature reaction flux $\phi_2$, adjustable magnetic shunts 27 and 28 are provided, as illustrated in the drawing. between the tips of the pole shoes 15 and 16 and adjacent to the brushes 18—18. The shunts 27 and 28 are revolvably mounted on adjusting screws 29 and 30, respectively, which are preferably constructed of non-magnetic material, such as brass. Hand wheels 31 and 32 are provided for independently adjusting the positions of the magnetic shunts 27 and 28.

Any suitable means may be provided for maintaining the magnetic shunts 27 and 28 in the aligned positions shown in the drawing. In order to more clearly illustrate the invention, however, any such aligning means have been omitted, but it will be readily understood that they may be provided to prevent the magnetic shunts 27 and 28 from rotating when the adjusting screws 29 and 30 are turned to provide the desired adjustment.

In experimenting with this device, I have found that the rate of change of the main flux $\phi_1$ is less than the rate of change of the armature reaction flux $\phi_2$. It is thought that this difference in the rates of change of these fluxes is caused by the interlinking of the main flux $\phi_1$ with the turns of the series field windings 21 and 22 which serve to decrease the rate at which the main flux is permitted to change. In addition, the path which the main flux $\phi_1$ traverses is considerably greater in extent than the path of the armature reaction flux $\phi_2$.

Because of this difference in the rate of change of the main flux $\phi_1$ and the armature reaction flux $\phi_2$, oscillations may be obtained during the transient period which exists while the current is changing in the welding circuit. As is well known, these changes constantly occur because of the extreme changes in the resistance of the arc 25 which varies from substantially zero at short circuit to infinity when the arc 25 is broken.

With a view to increasing the reluctance of the paths of the armature reaction flux $\phi_2$, damping windings 34 and 35 are provided around the magnetic shunts 27 and 28, respectively. The damping windings 34 and 35 preferably comprise single turns of a conductor, such as copper, each of which is short circuited so as to provide the desired damping effect. As will be readily understood by those skilled in the art, when the flux $\phi_2$ tends to increase or decrease, current is induced in the damping windings 34 and 35 which generates a flux that opposes the change in the armature reaction flux $\phi_2$.

While two magnetic shunts 27 and 28 have been illustrated with individual adjusting means for each, it will be readily apparent that only one of these devices may be used, if it is so desired.

In order to more fully set forth the functioning and operation of the dynamo-electric machine illustrated and described hereinbefore, reference will be made to the curves shown in Fig. 2 which demonstrate the operation of the machine with different settings of the magnetic shunt 27. The curves were plotted with flux densities as ordinates and load currents as abscissæ. The curve 37 represents the total flux $\phi_1$ plus $\phi_3$ which is generated by the series field windings 21 and 22, and the curve 38 represents the flux $\phi_1$ only. Curves 39 through 42 represent different values of $\phi_2$ through $\phi_2'''$, respectively, which correspond to different settings of the magnetic shunt 27. Thus when the magnetic shunt 27 is moved to a position immediately adjacent to the armature 17, the curve 39 is obtained, while the curve 42 is obtained when it is moved to an extreme outer position away from the armature 17.

The vertical difference between any of the curves 39 through 42 and the curve 38, as illustrated by the ordinate 43, represents the flux which is available for generating the short circuit current between the brushes 18—18 which in turn serves to generate the cross flux $\phi_4$. Since the voltage which appears between the main brushes 20—20 is a function of the flux $\phi_4$ which in turn may be considered to be a function of the flux generating the short circuit current, then the voltage appearing at the terminals of the machine may be considered as a function of the flux represented by the ordinate 43.

The various voltages which may be obtained for different settings of the magnetic shunt 27 are illustrated by the curves 39' through 42' in Fig. 3, in which the ordinates represent voltage and the abscissæ represent load current. It will be observed, from a consideration of the curves, for any particular setting of the magnetic shunt 27 that maximum load current occurs as well as zero voltage when any of the curves 39 through 42 intercept the curve 38. It will be readily understood under these conditions that the armature reaction flux $\phi_2$ is substantially equal to the main flux $\phi_1$, only sufficient flux $\phi_1$ remaining to maintain the short circuit condition.

For different positions of the magnetic shunts 27 and 28 the residual flux at no load will be varied accordingly with the result that slightly different no-load voltages will be obtained as is indicated by the curves in Fig. 3. For the sake of clearness, the different no-load fluxes are not shown by the curves in Fig. 2 since they occur outside of the operating range of the machine.

It may be pointed out that while the regulating systems of the prior art have been effective to vary the position of either of the curves 37 or 38 in Fig. 2 to obtain the desired regulation based on one of the curves 39 through 42 remaining fixed, I have provided for maintaining the curves 37 and 38 in fixed relation, and for varying the amount of the armature reaction flux $\phi_2$ in the manner illustrated by the curves 39 through 42. When this system of control is utilized, the adjustment of the output of the machine is rendered extremely simple and the losses thereof are reduced to a minimum.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. A dynamo-electric machine of the cross field type comprising, in combination, a pair of field poles of opposite polarity, an armature having a pair of short circuited brushes disposed between the field poles, and movable magnetic means disposed between the field poles and in proximity to the armature for regulating the amount of flux generated by armature reaction, thereby causing the machine to generate a predetermined amount of power.

2. A dynamo-electric machine of the cross field type comprising, in combination, a main frame, a pair of oppositely disposed field poles carried by the main frame, a series field winding disposed on at least one of the field poles, an armature disposed between the field poles and having a pair of short circuited brushes and a pair of main brushes, the main brushes being connected in series circuit relation with the field winding and to a load, and adjustable magnetic shunt means disposed between the tips of the field poles and in the path of the armature reaction flux generated by the current flowing through the main brushes for regulating the amount of armature reaction flux to vary the output of the machine.

3. A dynamo-electric machine of the cross field type comprising, in combination, a main frame, a pair of oppositely disposed field poles carried by the main frame, a series field winding disposed on at least one of the field poles, an armature disposed between the field poles and having a pair of short circuited brushes and a pair of main brushes, the main brushes being connected in series circuit relation with the field winding and to a load, magnetic shunt means disposed between the tips of the field poles and in the path of the armature reaction flux generated by the current flowing through the main brushes, and adjusting means operatively connected to the magnetic shunt means for varying the position thereof to regulate the amount of armature reaction flux and thereby the output of the machine.

4. A dynamo-electric machine of the cross field type comprising, in combination, a main frame, a pair of oppositely disposed field poles carried by the main frame, a series field winding disposed on at least one of the field poles, an armature disposed between the field poles, said armature having a pair of short circuited brushes in a plane substantially perpendicular to the plane of the flux generated by the series field winding and a pair of main brushes substantially in the plane of said flux, the main brushes being connected in series circuit relation with the series field winding and to a load, and an adjustable magnetic shunt disposed adjacent each short circuited brush and between the adjacent tips of said field poles for regulating the amount of armature reaction flux, thereby regulating the effective flux cut by the armature to vary the output of the machine.

5. A dynamo-electric machine of the cross field type comprising, in combination, a main frame, a pair of oppositely disposed field poles carried by the main frame, a series field winding disposed on at least one of the field poles, an armature disposed between the field poles, said armature having a pair of short circuited brushes in a plane substantially perpendicular to the plane of the flux generated by the series field winding and a pair of main brushes substantially in the plane of said flux, the main brushes being connected in series circuit relation with the series field winding and to a load, a magnetic shunt disposed adjacent each short circuited brush on opposite sides of the armature and between the adjacent tips of said field poles, and adjusting means operatively connected to each magnetic shunt for individually adjusting the magnetic shunts to regulate the amount of armature reaction flux, thereby regulating the effective flux cut by the armature to vary the output of the machine.

6. A dynamo-electric machine of the cross field type comprising, in combination, a main frame, a pair of oppositely disposed field poles carried by the main frame, a series field winding disposed on at least one of the field poles, an armature disposed between the field poles, said armature having a pair of short circuited brushes in a plane substantially perpendicular to the plane of the flux generated by the series field winding and a pair of main brushes substantially in the plane of said flux, the main brushes being connected in series circuit relation with the series field winding and to a load, and an adjustable magnetic shunt disposed adjacent one of the short circuited brushes and between adjacent tips of the field poles for regulating the amount of armature reaction flux, thereby regulating the effective flux cut by the armature to vary the output of the machine.

7. A dynamo-electric machine of the cross field type comprising, in combination, a pair of field poles of opposite polarity, a series field winding disposed on at least one of the field poles, an armature having a pair of short circuited brushes and a pair of main brushes disposed between the tips of the field poles, said main brushes being connected in series circuit relation to said field winding and to a load, a member of magnetic material disposed in the path of the armature reaction flux, and circuit means on said magnetic member for decreasing the rate of change of the flux passing therethrough.

8. A dynamo-electric machine of the cross-field type comprising, in combination, a pair of field poles of opposite polarity, an armature having a pair of short circuited brushes disposed between the field poles, movable magnetic means disposed between the tips of the field poles in proximity to the armature and in the path of the armature reaction flux for regulating the amount of said flux, thereby varying the power output of the machine, and means comprising a damping winding disposed on said magnetic means for decreasing the rate of change of flux through the magnetic means.

9. A dynamo-electric machine of the cross field type comprising, in combination, a main frame, a pair of oppositely disposed field poles carried by the main frame, a series field winding disposed on at least one of the field poles, an armature disposed between the field poles and having a pair of short circuited brushes and a pair of main brushes, the main brushes being connected in series circuit relation with the field winding and to a load, adjustable magnetic shunt means disposed between tips of the field poles and in the path of the armature reaction flux generated by the current flowing through the main brushes for regulating the amount of armature reaction flux to vary the output of the machine, and means comprising a short circuited conductor disposed around said shunt means for decreasing the rate of change of the armature reaction flux.

10. A dynamo-electric machine of the cross field type comprising, in combination, a main frame, a pair of oppositely disposed field poles carried by the main frame, a series field winding disposed on at least one of the field poles, an armature disposed between the field poles, said armature having a pair of short circuited brushes in a plane substantially perpendicular to the plane of the flux generated by the series field winding and a pair of main brushes substantially in the plane of said flux, the main brushes being connected in series circuit relation with the series field winding and to a load, an adjustable magnetic shunt disposed adjacent one of the short circuited brushes and between adjacent tips of the field poles for regulating the amount of armature reaction flux, thereby regulating the effective flux cut by the armature to vary the output of the machine, and means comprising a short circuited conductor disposed around said magnetic shunt for equalizing the rates of flux changes in the machine.

11. A dynamo-electric machine of the cross field type comprising, in combination, a main frame, a pair of oppositely disposed field poles carried by the main frame, a series field winding disposed on at least one of the field poles, an armature disposed between the field poles, said armature having a pair of short circuited brushes in a plane substantially perpendicular to the plane of the flux generated by the series field winding and a pair of main brushes substantially in the plane of said flux, the main brushes being connected in series circuit relation with the series field winding and to a load, an adjustable magnetic shunt disposed adjacent each short circuited brush and between the adjacent tips of said field poles for regulating the amount of armature reaction flux, thereby regulating the effective flux cut by the armature to vary the output of the machine, and means comprising a damping winding disposed around each magnetic shunt for decreasing the rate of change of the armature reaction flux.

12. A dynamo-electric machine of the cross field type comprising, in combination, a pair of field poles of opposite polarity, a series field winding disposed on at least one of the field poles, an armature having a pair of short circuited brushes and a pair of main brushes disposed between the field poles, said main brushes being connected in series circuit relation to said field winding and to a load, magnetic means for varying the relative values of the fluxes cut by the armature to regulate the output of the machine, and means for decreasing the rate of change of the flux passing through said magnetic means.

13. A dynamo-electric machine of the cross field type comprising, in combination, a pair of field poles of opposite polarity, an armature having a pair of short circuited brushes disposed between the field poles, and magnetic means disposed between the tips of the field poles in close proximity to the armature for increasing the armature reaction flux and thereby decreasing the effective flux cut by the armature to decrease the output of the machine.

JOHN H. BLANKENBUEHLER.